No. 813,105. PATENTED FEB. 20, 1906.
W. F. M. McCARTY.
PROCESS FOR DECOMPOSING WATER BY ELECTROLYSIS.
APPLICATION FILED NOV. 8, 1904.
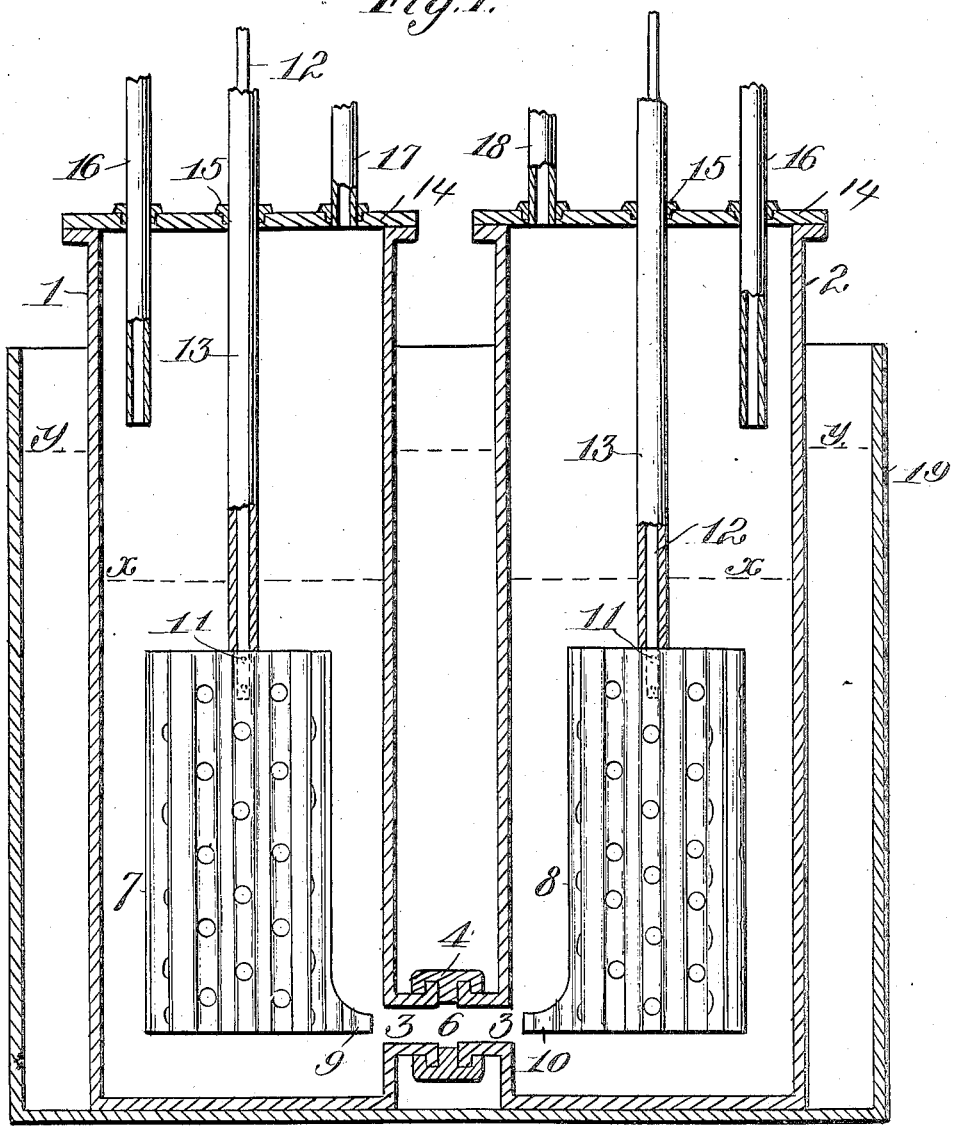
Witnesses:
C. D. Kesler
Inventor
William F. M. McCarty
by James L. Norris
Atty.

UNITED STATES PATENT OFFICE.

WILLIAM F. M. McCARTY, OF ROCKY RIDGE, MARYLAND, ASSIGNOR TO THOMAS A. DARBY, TRUSTEE, OF NEW YORK, N. Y.

PROCESS FOR DECOMPOSING WATER BY ELECTROLYSIS.

No. 812,105. Specification of Letters Patent. Patented Feb. 20, 1906.

Application filed November 2, 1904. Serial No. 231,240.

*To all whom it may concern:*

Be it known that I, WILLIAM F. M. MC-CARTY, a citizen of the United States, residing at Rocky Ridge, in the county of Frederick and State of Maryland, have invented new and useful Improvements in Processes for Decomposing Water by Electrolysis, of which the following is a specification.

This invention relates to a novel process for decomposing water by electrolysis, and has for its object to render the water, which is normally not an electrolyte, more susceptible to the action of an electric current, by adding to the water a substance which will disturb or break up the molecular arrangement of the hydrogen and oxygen of the water, and thus facilitate its ready decomposition. The substance that I add to the water is an alkali metal, and preferably I employ metallic sodium.

In order that the process and the manner of carrying it out may be more clearly understood, I have illustrated a convenient form of apparatus in the accompanying drawings, which I have found in practice to give highly-satisfactory results.

Referring to these drawings, Figure 1 is a vertical sectional view of an apparatus constructed according to my invention, and Fig. 2 is a top plan view of one of the electrodes.

1 2 indicate, respectively, two receptacles or tanks, each of which is provided near its lower end with an outlet-pipe 3, which outlets are connected by means of a rubber or other collar 4 to provide a conduit 6, connecting the two tanks.

7 8 indicate, respectively, two electrodes. These electrodes are each formed from a plate of platinum coiled upon itself a greater or less number of times, the lower portion of the outer coil being provided with a projecting portion, (illustrated by 9 and 10 on the respective electrodes.) The projecting or terminal portion 9 10 of each electrode is located directly opposite the opening in the conduit 6 in the respective tanks, as shown. Secured to the inner coil of each electrode at its upper end, as indicated at 11, is a suitable rod or conductor 12, which is incased in a glass tube 13, the latter passing through the top 14 and being surrounded by a suitable washer or stuffing-box 15 to provide a gas-tight connection. Extending through each of the tops 14 is a glass tube 16, by means of which the water and the chemical substances employed may be supplied to the tanks, and a glass tube for permitting the escape of the gas generated from the tanks, these latter tubes being indicated, respectively, by the numerals 17 and 18. The tanks are supplied with water to about the depth indicated by the dotted line $x$ $x$ and are submerged in an outer tank 19 to about the depth indicated by the dotted line $y$ $y$. The water having been supplied to the tanks, the alkali metal is supplied to each tank through the pipes 16, instantly causing ebullition of the water and, as is well known, liberation of hydrogen gas. At the moment of ebullition I supply current to the electrodes through the conductors 12, which are, of course, connected to a suitable source of current-supply. The discharge occurs between the terminal points 9 and 10 of the electrodes through the conduit 6, where the decomposition of the water occurs, oxygen being liberated at the anode 8 and hydrogen at the cathode 7.

In the operation of the device a great amount of heat is generated, and in order to keep the apparatus cool I partly submerge the same in the water of vessel 19, as indicated on the drawings. As before stated, the substance I employ to decrease the resistance of the water to the passage of the current and also to increase the facility with which it may be decomposed is metallic sodium. This substance possesses the property of decomposing water very rapidly. The product of the action of sodium upon water contains one part, by weight, of hydrogen, sixteen of oxygen, and twenty-three of sodium, so that the twenty-three parts of sodium have been exchanged or been found chemically equivalent to one part of hydrogen. Taking the symbol Na to represent twenty-three parts, by weight, of sodium, its action will be expressed thus:

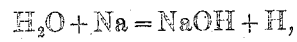
$$H_2O + Na = NaOH + H,$$

which of course is the atomic as distinguished from the molecular equation. In other words, when the sodium is added to the water a chemical reaction occurs in which one-half of the hydrogen of a part of the water is displaced by an equivalent quantity of the sodium radical, and consequently sodium hydrate is formed, which remains dissolved in the bulk of the water. As in the above operation the sodium is not confined to one part of the water, the action is not sufficiently intense to cause ignition of the escaping hydrogen. The essence of the invention resides in the fact that I take advantage of the known chemical reaction which occurs upon the addition of metallic sodium to water by causing the transmission of the current through the water at the moment that ebullition occurs, when the molecular structure of the water is for the time being destroyed and before new chemical combinations can occur—that is to say, my theory is that the electrical action occurs in advance of the chemical action, resulting in the rapid separation and liberation of the hydrogen and oxygen from the respective electrodes after the destruction of the molecular structure of the water and before a new arrangement of the molecules again occurs, as in the forming of the sodium hydrate. By proceeding according to my invention a very rapid production of the two gases in large quantities occurs with the expenditure of a small amount of current at a low potential.

In using my process I may or may not acidulate the water; but acidulation, as with sulfuric acid, assists the decomposition thereof.

The apparatus shown herein forms the subject-matter of a separate application for patent, filed November 8, 1904, Serial No. 231,938.

Having thus fully described my invention, what I claim as new, and desire to secure by Letters Patent, is—

1. The process of decomposing water which consists in adding to the water an alkali metal and then subjecting the water to the action of an electric current.

2. The process of decomposing water which consists in acidulating the water, adding thereto an alkali metal, and then subjecting the water to the action of an electric current.

3. The process of decomposing water which consists in adding to the water metallic sodium, and then subjecting the water to the action of an electric current.

4. The process of decomposing water which consists in acidulating the water, adding thereto metallic sodium, and then subjecting the water to the action of an electric current.

5. The process of decomposing water which consists in adding to the water metallic sodium, and at the moment of greatest ebullition subjecting the water to the action of an electric current.

In testimony whereof I have hereunto set my hand in presence of two subscribing witnesses.

WILLIAM F. M. McCARTY.

Witnesses:
BRUCE S. ELLIOTT,
GEO. W. REA.